United States Patent
Zur et al.

(10) Patent No.: US 10,340,958 B2
(45) Date of Patent: Jul. 2, 2019

(54) UNIQUE FREQUENCY PLAN AND BASEBAND DESIGN FOR LOW POWER RADAR DETECTION MODULE

(71) Applicant: Intel IP Corporation, Santa Clara, CA (US)

(72) Inventors: Sarit Zur, Petah-Tikva (IL); Ofer Benjamin, Petach-Tikva (IL); Eshel Gordon, Aloney Aba (IL)

(73) Assignee: Intel IP Corporation, Santa Clara, CA (US)

( * ) Notice: Subject to any disclaimer, the term of this patent is extended or adjusted under 35 U.S.C. 154(b) by 369 days.

(21) Appl. No.: 15/392,064

(22) Filed: Dec. 28, 2016

(65) Prior Publication Data

US 2018/0180714 A1 Jun. 28, 2018

(51) Int. Cl.
*G01S 7/02* (2006.01)
*H04B 1/00* (2006.01)
(Continued)

(52) U.S. Cl.
CPC .......... *H04B 1/001* (2013.01); *H04B 1/1607* (2013.01); *H04K 3/822* (2013.01); *H04W 16/14* (2013.01);
(Continued)

(58) Field of Classification Search
CPC . H04W 16/14; H04W 72/0453; H04W 84/12; H04W 88/06; H04W 72/048; H04W 74/0808; H04W 74/0816; H04W 24/02; H04W 48/16; H04W 72/04; H04W 52/02; G01S 7/021; G01S 7/023; G01S 13/753; G01S 13/86; G01S 7/352; G01S 3/043; G01S 7/486; H03M 1/12; H03M 1/46;
(Continued)

(56) References Cited

U.S. PATENT DOCUMENTS 6,297,764 B1 * 10/2001 Wormington ......... G01S 7/2921
342/101
9,130,584 B1 * 9/2015 Pagnanelli .............. H03M 3/38
(Continued)

OTHER PUBLICATIONS

"Understanding and Minimising ADC Conversion Errors." AN1636 Application Note. By Microcontroller Division Applications. pp. 1-42.
(Continued)

*Primary Examiner* — Olumide Ajibade Akonai
(74) *Attorney, Agent, or Firm* — Eschweiler & Potashnik, LLC

(57) ABSTRACT

An apparatus for a low-power radar detection (LPRD) receiver is proposed in this disclosure. The LPRD receiver comprises an analog-to-digital converter (ADC) circuit configured to receive an analog dynamic frequency selection (DFS) signal associated with a DFS channel in a DFS frequency band to generate a digital DFS signal. The ADC circuit comprises a finite impulse response (FIR) filter circuit configured to sample the analog DFS signal at an FIR sampling rate determined based on a predetermined frequency plan associated with the DFS frequency band to generate a sampled DFS signal; and an ADC conversion circuit configured to convert the sampled DFS signal to the digital DFS signal at an ADC conversion rate that is lower than the FIR sampling rate.

20 Claims, 7 Drawing Sheets

(51) Int. Cl.
*H04B 1/16* (2006.01)
*H04K 3/00* (2006.01)
*H04W 16/14* (2009.01)
*H04W 84/12* (2009.01)

(52) U.S. Cl.
CPC ............... *G01S 7/021* (2013.01); *G01S 7/023* (2013.01); *H04K 3/226* (2013.01); *H04W 84/12* (2013.01)

(58) Field of Classification Search
CPC .... H03M 3/344; H03M 1/001; H03M 1/0626; H03M 1/124; H03M 1/00; H03M 3/30; H03M 3/458
See application file for complete search history.

(56) References Cited

U.S. PATENT DOCUMENTS

| | | | | |
|---|---|---|---|---|
| 9,557,407 | B1* | 1/2017 | Rezk | H04B 1/123 |
| 2006/0165198 | A1* | 7/2006 | Tietjen | H04L 27/3845 |
| | | | | 375/331 |
| 2007/0126622 | A1* | 6/2007 | Nallapureddy | G01S 7/021 |
| | | | | 342/92 |
| 2016/0077134 | A1* | 3/2016 | Rezk | H04K 3/00 |
| | | | | 324/76.39 |
| 2016/0097846 | A1* | 4/2016 | Mortensen | G01S 7/52017 |
| | | | | 367/97 |
| 2018/0003797 | A1* | 1/2018 | Perez-Ramirez | G01S 7/023 |
| 2018/0106884 | A1* | 4/2018 | Marr | G01S 7/352 |

OTHER PUBLICATIONS

"Sampling and Aliasing." Chapter 4, ECE 2610 Signal and Systems. 24 pages.

Kester, Walt. "What the Nyquist Criterion Means to Your Sampled Data System Design." Analog Devices. MT-002 Tutorial. pp. 1-12.

Kester, Walt. "ADC Architectures II: Successive Approximation ADCs." Analog Devices. MT-021 Tutorial. pp. 1-14.

* cited by examiner

UNIQUE FREQUENCY PLAN AND BASEBAND DESIGN FOR LOW POWER RADAR DETECTION MODULE

FIELD

The present disclosure relates to WiFi receivers, and more specifically to an apparatus and a method for implementing a low-power radar detection (LPRD) WiFi receiver.

BACKGROUND

Dynamic frequency selection (DFS) is a spectrum-sharing mechanism that allows wireless LANs (WLANs) to coexist with radar systems. The majority of the unlicensed 5 GHz band of WiFi is shared with radars (these channels are called DFS channels). DFS channel use is allowed, only given no interference with radar signals. Therefore, devices that use the DFS channels have to detect the presence of a radar signal on the channel they are using and, if the level of the radar signal is identified to be above a certain threshold, the device has to vacate that channel and select an alternate channel. In order to detect the radar signals, a radar detection receiver that is capable of continuously monitoring the DFS channels have to be implemented within these devices. In order to continuously monitor the DFS channels, the radar detection receivers have to be always ON and therefore, power consumption of such receivers is an important consideration.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
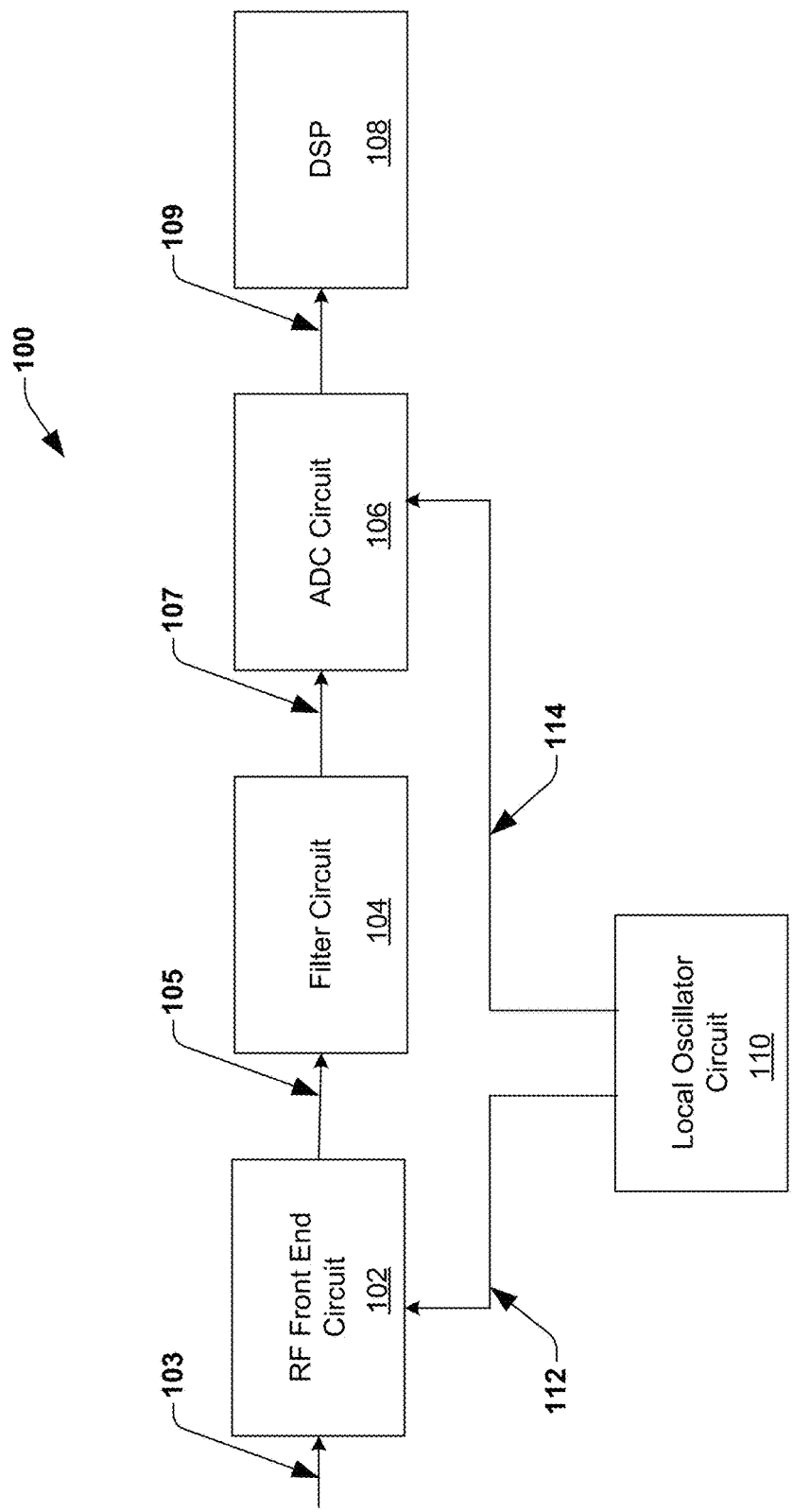
FIG. 1 illustrates a simplified block diagram of a low-power radar detection receiver, according to one embodiment of the disclosure.

In one embodiment of the disclosure, a radar detection receiver is disclosed. The radar detection receiver comprises an analog-to-digital converter (ADC) circuit configured to receive an analog dynamic frequency selection (DFS) signal associated with a DFS channel in a DFS frequency band to generate a digital DFS signal. The ADC circuit comprises a finite impulse response (FIR) filter circuit configured to sample the analog DFS signal at an FIR sampling rate determined based on a predetermined frequency plan associated with the DFS frequency band to generate a sampled DFS signal; and an ADC conversion circuit configured to convert the sampled DFS signal to the digital DFS signal at an ADC conversion rate that is lower than the FIR sampling rate.

In one embodiment of the disclosure, a radar detection receiver is disclosed. The radar detection receiver comprises a mixer circuit configured to receive and down-convert an analog dynamic frequency selection (DFS) signal associated with a DFS channel in a DFS frequency band from a radio frequency (RF) range to a baseband frequency range, to generate a down-converted DFS signal and a filter circuit configured to filter the down-converted DFS signal to generate a filtered DFS signal. The radar detection receiver further comprises an analog-to-digital converter (ADC) circuit comprising a finite impulse response (FIR) filter circuit configured to sample the filtered DFS signal at an FIR sampling rate determined based on a predetermined frequency plan associated with the DFS frequency band to generate a sampled DFS signal; and an ADC conversion circuit configured to convert the sampled DFS signal to a digital DFS signal at an ADC conversion rate that is lower than the FIR sampling rate.

In one embodiment of the disclosure, a method for a radar detection receiver is disclosed. The method comprises receiving and sampling an analog dynamic frequency selection (DFS) signal associated with a DFS channel in a DFS frequency band, at a finite impulse response (FIR) sampling rate determined based on a predetermined frequency plan associated with the DFS frequency band to generate a sampled DFS signal, at an FIR filter circuit associated with an analog-to-digital converter (ADC) circuit; and converting the sampled DFS signal to a digital DFS signal at an ADC conversion rate that is lower than the FIR sampling rate, at an ADC conversion circuit associated with the ADC circuit.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the majority of the unlicensed 5 GHz WiFi band is shared with radars (these channels are called DFS channels). DFS channel use is allowed, only given no interference with radar signals. In some embodiments, a master device (i.e., a device capable of utilizing the DFS channels for transmission) is required to include radar detection capabilities. In accordance, the master device is required to comply with a set of radar detection criteria, before the master device is granted to use a DFS channel. The regulatory requirement for the master device, is to "listen" to the channel (namely, "channel availability check"), for at least one minute, in order to make a decision on the presence of radar. Only then, assuming no radars were detected, the transmission on DFS channels is allowed. However, in order to efficiently implement the radar detection criteria, a possible option is to implement a radar detection receiver, which is configured to be "always-ON" (i.e. perform detection 100% of the time). Such an "always-ON" receiver would allow the user (i.e., the master device) to start its ad-hoc activity on a DFS channel instantly (without the need to wait for one minute, which is a very bad user experience). However, for battery-fed mobile devices, which have the capability to serve as master devices (e.g. tethering, WiFi direct), such "always-ON" receiver can greatly impact the battery life.

In the analog/RF receiver domain, a major percentage of the receiver power is consumed by the base-band (BB) and the analog-to-digital converter (ADC) circuits. The main reason is the need to avoid aliasing effects of nearby channels (i.e., to avoid the replicas of nearby signals from falling on our signal of interest). In particular, in the case of radar detection receivers, in order to efficiently detect radar signals, there is a need to avoid desensitization due to aliasing of other nearby WiFi signals, across the entire 5 GHz unlicensed band (5170~5915 MHz). In order to avoid effects of aliasing from nearby channels, typical implementations of RF receivers utilize two different architectures that include an analog filter followed by an ADC circuit. For example, a first architecture that includes a high order analog filter (mostly, $3^{rd}$ order) that act as an anti-aliasing filter, followed by a low sampling rate ADC (e.g., a Nyquist rate ADC). However, such a high-order filter requires amplifiers of a wide gain-bandwidth, as well as high DC gain. Further, such amplifiers are complicated to design and they increase significantly the power consumption of an RF receiver. In some embodiments, a Nyquist rate ADC comprises an ADC having as sampling rate at least twice the bandwidth of the signal to be sampled. Further, a second architecture for RF receivers include a low-order filter (e.g., first-order filter) followed by a high rate ADC (e.g., high sampling rate ADC). However, such an ADC has its power consumption increased (more than linear) with the sampling frequency, thus making it unattractive for "always-ON" receivers. Moreover, the number of digital bits (or their rate) increases as well, and as a result the DSP power increases too.

Therefore, in order to overcome the disadvantages of the above two architectures, an apparatus and a method for a low-power radar detector (LPRD) receiver is proposed in this disclosure. In particular, in one embodiment, an LPRD receiver that utilizes a unique frequency plan associated with the DFS frequency band, in order to avoid aliasing of the DFS signals in the DFS frequency band is proposed in this disclosure. The basic principle is to avoid aliasing of WiFi HB (5~6 GHz) blockers by using sampling rate determined according to the unique frequency plan (approx. above 700 MSPS), in an efficient manner. However, in this embodiment, in order to avoid using a high sampling rate ADC, the high sampling rate (approx. above 700 MSPS), is realized using a discrete low power finite impulse response (FIR) filter, while the ADC works at low rate (e.g., low conversion rate) and consumes lower power.

In typical implementations of an ADC having a sampling rate of x Msps, the ADC comprises an ADC sampling circuit that samples the ADC input on a single capacitor, every cycle of the x Msps clock, followed by an ADC conversion circuit that converts the sampled ADC input to a digital signal at a conversion rate of x Msps (i.e., generate N bit digital data every cycle of x Msps clock), proportional to the sampling rate. In some embodiments, the sampling rate corresponds to a rate at which an input signal is sampled and the conversion rate corresponds to a rate at which output digital data of the ADC is generated. Therefore, in typical implementations of a high-rate ADC, the ADC comprises an ADC sampling circuit having a high sampling rate, followed by an ADC conversion circuit having a high conversion rate, proportional to the high sampling rate.

In some embodiments, the FIR filter proposed herein replaces the ADC sampling circuit in typical implementations of ADC. In some embodiments, the FIR filter is configured to sample the ADC input at a sampling rate determined according to the unique frequency plan. In some embodiments, replacing the ADC sampler circuit with an FIR filter (as proposed in this disclosure) enables to utilize a low rate (e.g., corresponding to the Nyquist rate) ADC conversion circuit that has a conversion rate much lower than the sampling rate of the FIR filter, instead of a high rate ADC conversion circuit that is utilized in typical implementations of a high sampling rate ADC.

FIG. 1 illustrates a simplified block diagram of a low-power radar detector (LPRD) receiver 100, according to one embodiment of the disclosure. In some embodiments, the LPRD receiver 100 is configured to monitor the presence of radar signals in dynamic frequency selection (DFS) channels in the 5 GHz WiFi band, prior to utilizing the DFS channels. In some embodiments, the DFS channels comprise channels associated with a DFS frequency bands (e.g., 5260 MHz-5720 MHz) within the 5 GHz WiFi frequency band (e.g., 5170 MHz-5925 MHz). In the embodiments described herein, signals associated with the DFS channels are referred to as DFS signals. In some embodiments, the LPRD receiver 100 comprises a radio frequency (RF) front end circuit 102, a filter circuit 104, an analog-to-digital converter (ADC) circuit 106 and a digital signal processor (DSP) 108. In some embodiments, the LPRD receiver 100 further comprises a local oscillator (LO) circuit 110 configured to provide an LO signal (e.g., 112 or 114) to the RF front end circuit 102 and the ADC circuit 106, respectively.

In order to detect the presence of radar signals in the DFS channels, in some embodiments, the RF front end circuit 102 is configured to receive and process an analog DFS signal 103 associated with the DFS channel to generate a down-converted DFS signal 105. In some embodiments, the RF front end circuit 102 can comprise a low power RF amplifier (not shown) configured to amplify the analog DFS signal 103 and a mixer circuit (not shown) configured to down-convert the analog DFS signal 103 from an RF frequency to a baseband frequency to generate the down-converted DFS signal 105. In some embodiments, the RF frequency comprises a frequency associated with the DFS frequency band (e.g., 5260 MHz-5720 MHz). In some embodiments, the mixer circuit is configured to down-convert the analog DFS signal 103 to the baseband frequency based on mixing the analog DFS signal 103 at RF frequency with the LO signal 112. In some embodiments, the LO signal 112 has a frequency between 5.26 GHz to 5.72 GHz (i.e., the DFS frequency band). In some embodiments, the LO circuit 110 can comprise a phase locked loop (PLL) configured to generate the LO signals 112 or 114 based on a reference clock (not shown).

In some embodiments, the filter circuit 104 is configured to receive and filter the down-converted DFS signal 105 to generate a filtered DFS signal 107. In some embodiments, the filter circuit 104 comprises an anti-aliasing filter configured to filter out blocker signals of nearby WiFi frequencies, in order to make sure that replicas of the blocker signals (or interferers) does not fall on our signal of interest (i.e., the DFS signal 103). In some embodiments, filtering out the blocker signals by the filter circuit 104 enables to detect radar signals in the DFS channels efficiently. In some embodiments, in order to keep the power consumption of the filter circuit 104 low, the filter circuit 104 is implemented as a first order filter comprising only a single real pole. However, other implementations of the filter circuit 104 (e.g., higher order filter) are also possible, though not optimal.

In some embodiments, the ADC circuit 106 is configured to receive the filtered DFS signal 107 and convert the filtered DFS signal 107 to a digital DFS signal 109. In the embodiments where the filter circuit 104 comprises a low-order filter, in order to avoid the aliasing effects of the blocker signals from nearby WiFi frequencies, high sampling rate (i.e., much above the Nyquist rate) has to be utilized in the ADC circuit 106. In some embodiments, in order to efficiently eliminate the aliasing effects on the DFS signals, from nearby WiFi signals, the sampling rate of the ADC circuit 106 comprises an FIR sampling rate, determined based on a predetermined frequency plan associated with the DFS frequency band. In some embodiments, the predetermined frequency plan associated with the DFS frequency band is derived considering two factors, that is, a frequency range of the DFS signals (i.e., 5260-5720 MHz) and a frequency range where the WiFi blockers may exist (i.e., 5170-5925 MHz), the details of which are given in an embodiment below.

In some embodiments, the ADC circuit 106 can comprise a finite impulse response (FIR) filter circuit (not shown) comprising a plurality of capacitor stages configured to sample the filtered DFS signal 107 at the FIR sampling rate, followed by a low rate (i.e., a low conversion rate) ADC conversion circuit (within the ADC circuit 106) to generate the digital DFS signal 109, the details of which are given in embodiments below. In some embodiments, the conversion rate of the ADC conversion circuit is lower than the FIR sampling rate. In some embodiments, the FIR filter circuit replaces an ADC sampling circuit comprising a single capacitor, in typical implementations of an ADC. In some embodiments, the plurality of capacitors of the FIR filter circuit is the same size as the single capacitor of the ADC sampling circuit, in the typical implementations of the ADC. In some embodiments, the FIR sampling rate and the conversion rate of the ADC circuit 106 are derived from the LO signal 114 by dividing the LO frequency to the required frequency. In some embodiments, the DSP 108 is configured to receive the digital DFS signal 109 and process the digital DFS signal to determine the presence of radar signals.

Figure 2:
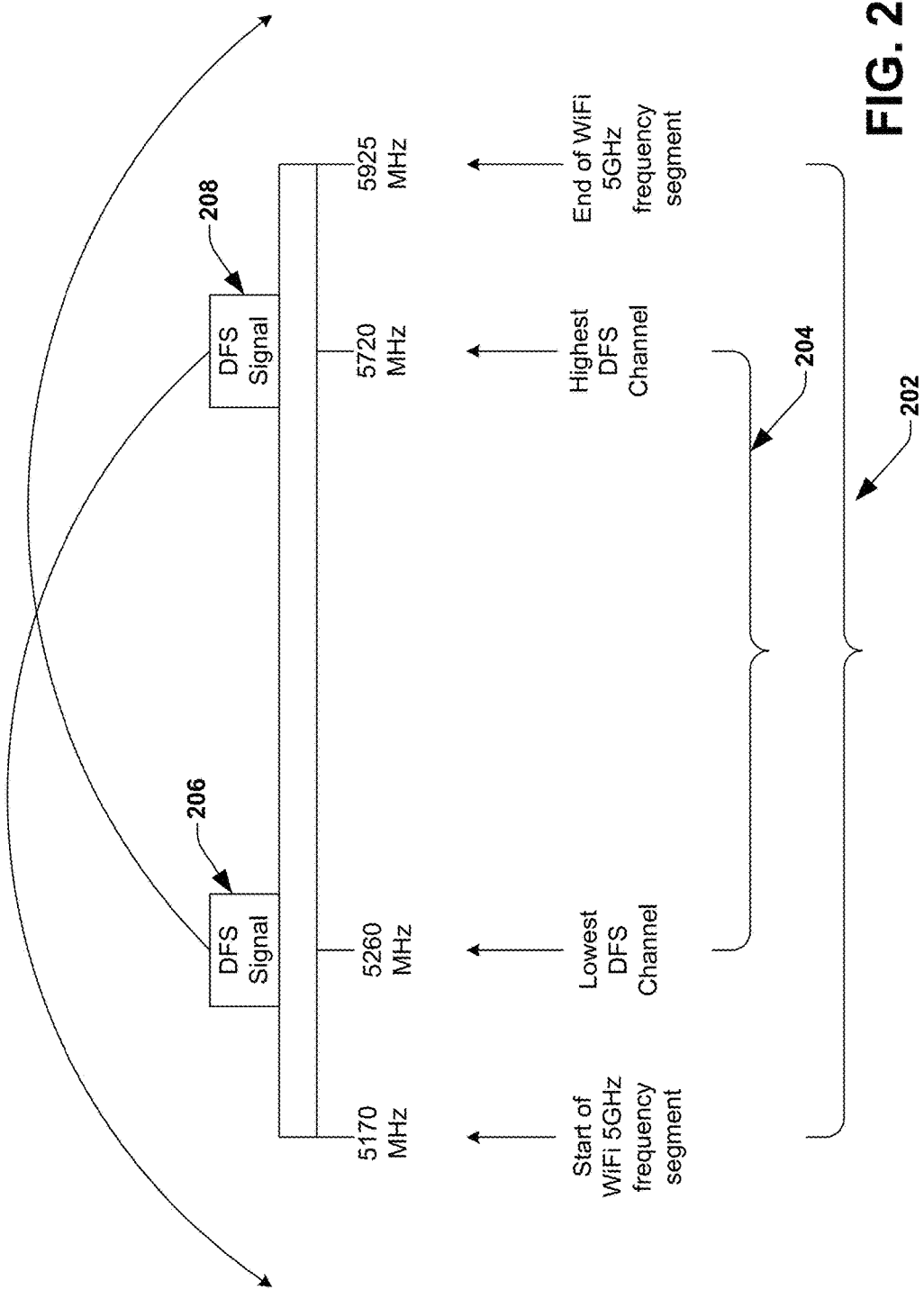
FIG. 2 illustrates a DFS frequency band, according to one embodiment of the disclosure.

FIG. 2 illustrates a unique frequency plan 200 associated with the DFS frequency band, according to one embodiment of the disclosure. In some embodiments, the unique frequency plan 200 defines the predetermined frequency plan, indicated above with respect to FIG. 1. In some embodiments, the unique frequency plan 200 enables to determine the FIR sampling rate for the ADC circuit 106 in FIG. 1 above. In some embodiments, choosing the FIR sampling rate of the ADC circuit 106 based on the unique frequency plan 200, enables to eliminate aliasing due to WiFi interferers in the 5 GHz WiFi band on DFS signals. The unique frequency plan 200 is derived based on the 5 GHz WiFi frequency band 202 and the DFS frequency band 204. In some embodiments, the FIR sampling rate of the ADC circuit 106 is chosen such that WiFi blockers are not aliased on to our DFS signal of interest. Typically, if a signal is sampled at a sampling frequency, fs=x Msps, then replicas of signals at multiples of the sampling frequency fs, that is 2 fs, 3 fs etc. from the signal, falls on the signal, causing aliasing.

Referring to FIG. 2 again, the DFS signals (i.e., our signal of interest) can be anywhere in the DFS frequency band (i.e., 5260 MHz to 5720 MHz). Suppose, our signal of interest is the DFS signal 206, at the lowest DFS channel of the DFS frequency band 204, say at 5260 MHz. If the DFS signal 206 is sampled at, say 200 Msps, the replicas of signals at 5460 MHz, 5660 MHz, 5860 MHz etc. of the 5 GHz WiFi frequency band 202, falls on the DFS signal 206, causing aliasing. Therefore, in order to avoid aliasing of the DFS signal 206 by WiFi interferers, the FIR sampling rate or frequency is chosen such that signals at multiples of the FIR sampling rate from the DFS signal 206 (i.e., WiFi blocker signals), whose replicas can fall on the DFS signal 206 are designed to fall outside the 5 GHz WiFi frequency band 202. For example, if the FIR sampling rate fs is chosen as, say 700 Msps, then replicas of signals at 5960 MHz (i.e., 5260 MHz+700 MHz), 6660 MHz (i.e., 5260 MHz+(2×700) MHz) etc. falls on the DFS signal 206. However, the frequencies 5960 MHz, 6660 MHz etc. are outside the 5 GHz WiFi frequency band 202 and does not contain any energy associated therewith. Therefore, replicas of the signals at the frequencies 5960 MHz, 6660 MHz etc. does not cause aliasing effects on the DFS signal 206. Therefore, according to the unique frequency plan 200, if the FIR sampling rate is chosen to be above 665 Msps (i.e., 5925 MHz-5260 MHz), then aliasing due to WiFi interferers in the 5 GHz WiFi frequency band 202 on the DFS signal 206 can be avoided.

Similarly, if we consider the DFS signal 208 at 5720 MHz, sampling the DFS signal 208 at an FIR sampling rate above 550 Msps (i.e., 5720 MHz-5170 MHZ), say 600 Msps, cause the signals at multiples of the FIR sampling rate from the DFS signal 208, for example, at 5120 MHz, 4520 MHz etc. (i.e., WiFi blocker signals), whose replicas can fall on the DFS signal 206, to fall outside the 5 GHz WiFi frequency band 202 and therefore, does not cause aliasing effects on the DFS signal 208. However, considering the DFS signal 206 and the DFS signal 208 and any DFS signals in between, an optimal FIR sampling rate above 665 Msps is to be chosen to avoid the aliasing due to WiFi interferers over the entire frequency range of the 5 GHz WiFi frequency band (5170-5925 MHz). In some embodiments, an FIR sampling rate of approximately 700 Msps is chosen as an optimal sampling rate for the ADC circuit 106 of the LPRD receiver in FIG. 1. That is, an FIR sampling rate of approximately 700 Msps, enables to move the WiFi blockers that cause aliasing of the DFS signals 206 or 208 or any DFS signals in between, outside of the 5 GHz WiFi frequency band. However, in other embodiments, other FIR sampling rates above 665 Msps can be chosen.

Figure 3:
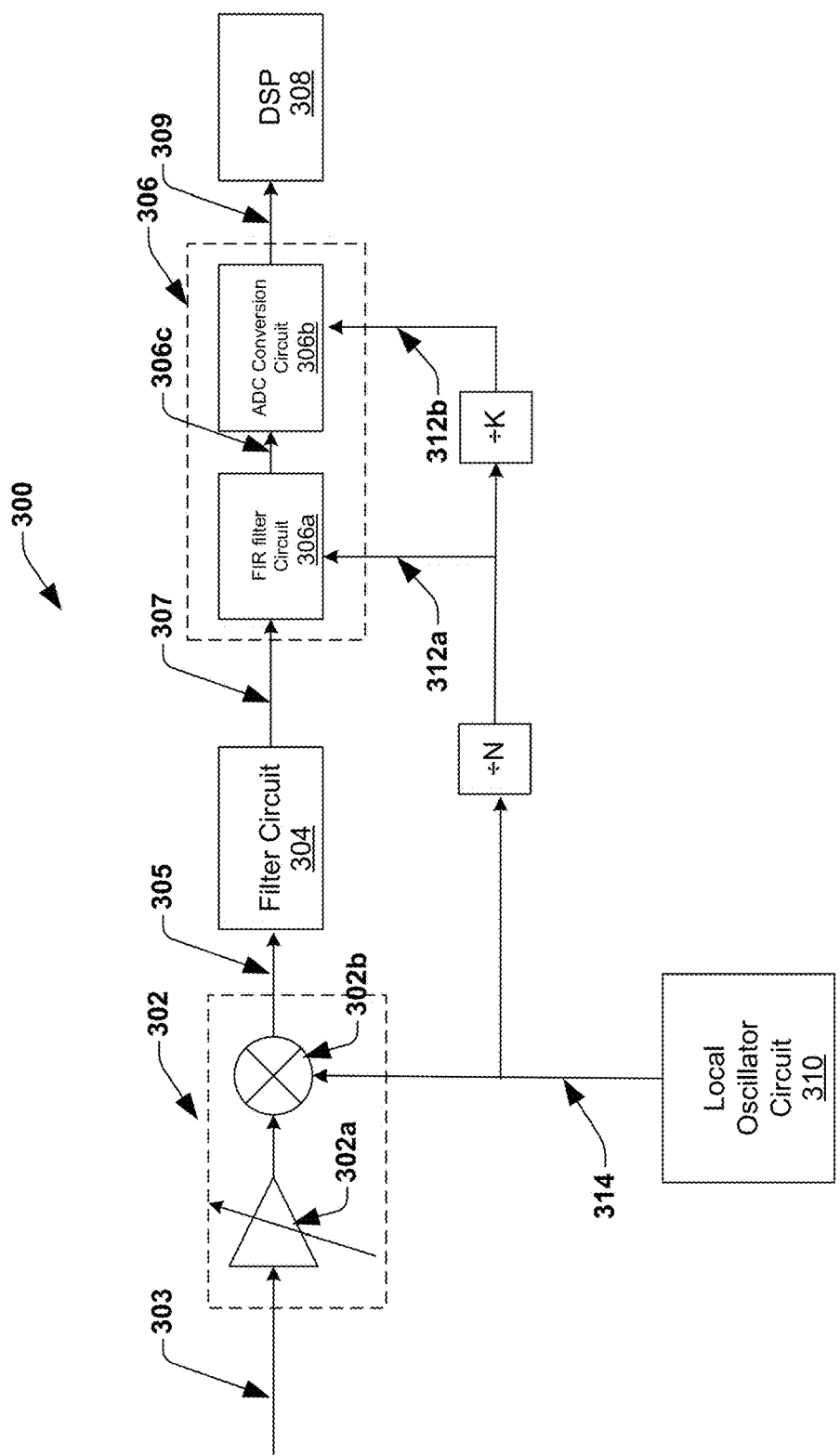
FIG. 3 illustrates a block diagram of a low-power radar detection receiver, according to another embodiment of the disclosure.

FIG. 3 illustrates a low-power radar detector (LPRD) receiver 300, according to one embodiment of the disclosure. In some embodiments, the LPRD receiver 300 is similar to the LPRD receiver 100 in FIG. 1 and is configured to monitor the presence of radar signals in dynamic frequency selection (DFS) channels associated with a DFS frequency band in the 5 GHz WiFi band, prior to utilizing the DFS channels. In some embodiments, the LPRD receiver 300 comprises a radio frequency (RF) front end circuit 302, a filter circuit 304, an analog-to-digital converter (ADC) circuit 306 and a digital signal processor (DSP) 308. In some embodiments, the LPRD receiver 300 further comprises a local oscillator (LO) circuit 310 configured to provide an LO signal (e.g., 314) to the RF front end circuit 302 and the ADC circuit 306, respectively.

In order to detect the presence of radar signals in the DFS channels, in some embodiments, the RF front end circuit 302 is configured to receive and process an analog DFS signal 303 associated with the DFS channel to generate a down-converted DFS signal 305. In some embodiments, the RF front end circuit 302 comprises a low power RF amplifier 302a configured to amplify the analog DFS signal 303 and a mixer circuit 302b configured to down-convert the analog DFS signal 303 from an RF frequency (e.g., 5260 MHz-5720 MHz) to a baseband frequency to generate the down-converted DFS signal 305. In some embodiments, the mixer circuit 302b is configured to down-convert the analog DFS signal 303 to the baseband frequency based on mixing the analog DFS signal 303 at the RF frequency with the LO signal 314. In some embodiments, the LO signal 314 has a frequency between 5.26 GHz to 5.72 GHz (i.e., the DFS frequency band).

In some embodiments, the filter circuit 304 is configured to receive and filter the down-converted DFS signal 305 to generate a filtered DFS signal 307. In some embodiments, the filter circuit 304 comprises an anti-aliasing filter configured to filter out blocker signals of nearby WiFi frequencies, in order to make sure that replicas of the blocker signals (or interferers) does not fall on our signal of interest (i.e., the DFS signal 303). In some embodiments, filtering out the blocker signals by the filter circuit 304 enables to detect radar signals in the DFS channels efficiently. In some embodiments, in order to keep the power consumption of the filter circuit 304 low, the filter circuit 304 is implemented as a first order filter comprising only a single real pole. However, other implementations of the filter circuit 304 (e.g., higher order filter) are also possible, though not optimal.

The ADC circuit 306 comprises an FIR filter circuit 306a configured to sample the filtered DFS signal 307 to generate a sampled DFS signal 306c. In some embodiments, the FIR filter circuit 306a replaces an ADC sampler circuit in typical implementations of an ADC. In some embodiments, the FIR filter circuit 306a can comprise a plurality of sampling capacitor stages configured to sample the filtered DFS signal 307 at an FIR sampling rate, determined based on the unique frequency plan as explained above with respect to FIG. 2. In such embodiments, the filtered DFS signal 307 is sampled across each of the sampling capacitors of the FIR filter circuit 306a, at the FIR sampling rate with a phase shift with respect to one another, to generate a plurality of respective DFS samples at the FIR sampling rate. For example, a first capacitor of the plurality of capacitors is configured to sample the filtered DFS signal 307 during a first sampling period to generate a first DFS sample, followed by a next capacitor in the plurality of capacitors and so on.

In some embodiments, the FIR filter circuit 306a is further configured to average the plurality of DFS samples to generate the sampled DFS signal 306c, once the respective DFS samples associated with each of the sampling capacitors of the plurality of sampling capacitors are generated. For example, if the FIR filter circuit 306a comprises 4 sampling capacitors, 4 DFS samples generated across the respective 4 sampling capacitors are averaged to generate the sampled DFS signal 306c. Therefore, in effect, the frequency of the sampled DFS signal 306c is less than the FIR sampling rate. In this particular example, the frequency of the sampled DFS signal 306c is only one-fourth of the FIR sampling rate. In some embodiments, the plurality of sampling capacitor stages of the FIR filter circuit 306a is divided into a first plurality of sampling capacitors, forming a first FIR stage (not shown) and a second plurality of sampling capacitors forming a second FIR stage (not shown), the details of such an implementation is given in an embodiment below. In such embodiments, the first FIR stage is configured to sample the filtered DFS signal 307 during a first interval and the second FIR stage is configured to sample the filtered DFS signal 307 during a second, different interval.

In some embodiments, the averaging of the DFS samples further has some filtering effects, further contributing to the rejection of the WiFi blocker signals. For example, in some embodiments, the FIR filter circuit 306a and the filter circuit 304 together provides sufficient rejection for the adjacent and alternate WiFi interferers that alias the DFS signals of interest. In some embodiments, the combined rejection from the FIR filter circuit 306a and the filter circuit 304 prevents ADC clipping. The ADC circuit 306 further comprises an ADC conversion circuit 306b configured to convert the sampled DFS signal 306c to a digital DFS signal 309 at an ADC conversion rate that is lower than the FIR sampling rate. In some embodiments, the ADC conversion rate corresponds to the frequency of the sampled DFS signal 306c, in order to efficiently process the sampled DFS signal 306c. In some embodiments, averaging the DFS samples of the FIR filter circuit 306a to generate the sampled DFS signal 306c at a lower sampling rate, compared to the FIR sampling rate enables to utilize a low rate ADC conversion circuit 306b in the ADC circuit 306. In some embodiments, the use of lower ADC conversion rate in the ADC conversion circuit 306b, enables to reduce the power consumption of the LPRD receiver 300, while still achieving the required blocker rejection. In some embodiments, the ADC conversion circuit 306b comprises an oversampled ADC and the ADC conversion rate is chosen to be higher than a Nyquist rate defined by a bandwidth of the down-converted DFS signal 305 (e.g., 40 MHz). Typically, DFS signal bandwidths go up to 80 MHz RF bandwidth or 40 MHz baseband bandwidth.

In some embodiments, the number of sampling capacitors in the FIR filter circuit 306a is determined based on the FIR sampling rate and the ADC conversion rate. For example, in some embodiments, if the ADC conversion rate is chosen based on Nyquist rate (or oversampled rate) as x Msps, and the FIR sampling rate (determined based on the unique frequency plan) is approximately 4 times the ADC conversion rate, that is, 4× Msps, then the FIR filter circuit 306a is configured to include 4 capacitors. However, other possible ways of determining the number of sampling capacitors can also be utilized. In some embodiments, the FIR sampling rate and the ADC conversion rate of the ADC circuit 306 are derived from the LO signal 314 by dividing the LO frequency to the required frequency. In some embodiments, the DSP 308 is configured to receive the digital DFS signal 309 and process the digital DFS signal 309 to determine the presence of radar signals. In some embodiments, the plurality of sampling capacitors of the FIR circuit 306a is the same size as the size of a single capacitor in typical implementations of ADC sampling circuit (e.g., if the size of the single capacitor is C, then the size of each of the plurality of sampling capacitors is C/N, where N is the number of sampling capacitors in the FIR circuit 306a). Therefore, power consumption of the FIR circuit 306a is comparable to the ADC sampling circuit in typical implementations of ADC, except the power consumed for the higher clock distribution in the FIR circuit 306a (i.e., for sampling across the plurality of sampling capacitors with a phase shift with respect to one another), which is negligible compared to utilizing a high conversion rate ADC conversion circuit, in typical implementations of ADC.

Figure 4:
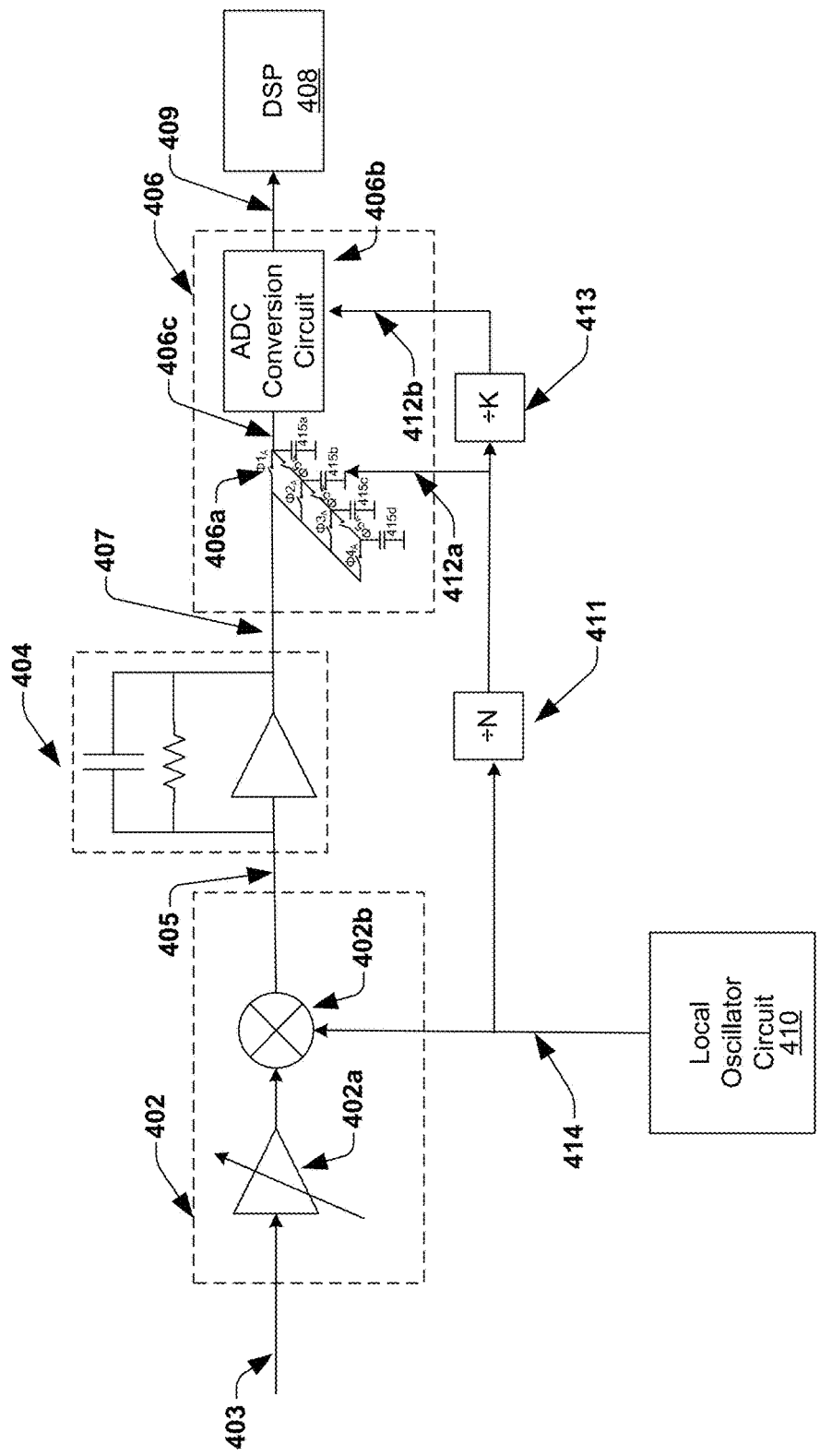
FIG. 4 illustrates an example implementation of a low-power radar detection receiver, according to one embodiment of the disclosure.

FIG. 4 illustrates an example implementation of a low-power radar detector (LPRD) receiver 400, according to one embodiment of the disclosure. In some embodiments, the LPRD receiver 400 illustrates one possible way of implementation of the LPRD receiver 300 in FIG. 3. However, other possible ways of implementation of the LPRD receiver 300 is also contemplated to be within the scope of this disclosure. The LPRD receiver 400 comprises a radio frequency (RF) front end circuit 402, a filter circuit 304, an analog-to-digital converter (ADC) circuit 406 and a digital signal processor (DSP) 408. In some embodiments, the LPRD receiver 400 further comprises a local oscillator (LO) circuit 410 configured to provide an LO signal (e.g., 414) to the RF front end circuit 402 and the ADC circuit 406, respectively.

The RF front end circuit 402 comprises a low power RF amplifier 402a configured to amplify an analog DFS signal 403 at an RF frequency range (e.g., 5260 MHz-5720 MHz) associated with a DFS frequency band and a mixer circuit 402b configured to down-convert the analog DFS signal 403 from the RF frequency to a baseband frequency to generate a down-converted DFS signal 405. In some embodiments, the mixer circuit 402b is configured to down-convert the analog DFS signal 403 to the baseband frequency based on mixing the analog DFS signal 403 at the RF frequency with the LO signal 414. In some embodiments, the LO signal 414 has a frequency between 5.26 GHz to 5.72 GHz (i.e., the DFS frequency band). In some embodiments, the analog DFS signal 403 has a bandwidth up to 80 MHz and the down-converted DFS signal 405 has a bandwidth up to 40 MHz. Typically, RF bandwidth of a signal is twice the baseband bandwidth, due to double-sided amplitude modulation (AM).

The filter circuit 404 comprises a first order filter comprising only a single real pole configured to receive and filter the down-converted DFS signal 405 to generate a filtered DFS signal 407. The ADC circuit 406 comprises an FIR filter circuit 406a configured to sample the filtered DFS signal 407 at an FIR sampling rate to generate a sampled DFS signal 406c. In some embodiments, the FIR sampling rate is determined based on the unique frequency plan as explained above with respect to FIG. 2. As explained above with respect to FIG. 2, according to the unique frequency plan, in order to avoid aliasing due to WiFi blockers or interferers in the 5 GHz WiFi frequency band on the DFS signal 403 (i.e., our signal of interest), an FIR sampling rate above 665 Msps has to be utilized for the ADC circuit 406. Therefore, in this embodiment, an FIR sampling rate of approximately 700 Msps is chosen for the FIR filter circuit 406a, though other values above 665 Msps can be chosen as the FIR sampling rate in other embodiments.

In this embodiment, the 700 Msps clock is provided to the FIR filter circuit 406 by dividing the LO frequency (i.e., the LO signal 414) by a dividing ratio, N=7 to obtain an FIR clock 412a of approximately 700 Msps (i.e., 5.26 GHz/7). In other embodiments, however, other dividing ratio can be utilized for other FIR sampling rate, as long as the non-aliasing requirement, according to the unique frequency plan is met. Further, in this embodiment, the FIR filter circuit 406a is chosen to include 4 sampling capacitors (415a, 415b, 415c and 415d) configured to sample the filtered DFS signal 407 at 700 Msps. However, in other embodiments, the FIR filter circuit 406a can include more than 4 sampling capacitors. In this embodiment, the filtered DFS signal 407 is sampled across each of the 4 sampling capacitors with a phase shift with respect to one another, based on switching the switches φ1A, φ2A, φ3A and φ4A, respectively, to generate 4 respective DFS samples at the FIR sampling rate. In some embodiments, the 4 DFS samples are further averaged to generate the sampled DFS signal 406a, based on switching the switches φ5A, the detailed implementation of which is given in an embodiment below. Therefore, in this embodiment, a sampling rate (or frequency) of the sampled DFS signal 406a is one-fourth of the FIR sampling rate of 700 Msps, which is approximately 175 Msps. In some embodiments, the filtered DFS signal 407 is sampled across each of the 4 sampling capacitors of the FIR filter circuit 406a, in accordance with the switching control signals 558, 560, 562 and 564 of the timing diagram 550 in FIG. 5b and the 4 DFS samples are averaged, in accordance with the switching control signal 566 of the timing diagram 550 in FIG. 5b. In some embodiments, the FIR filter circuit 406a is implemented to comprise a first FIR stage comprising 4 sampling capacitors and a second FIR stage comprising 4 sampling capacitors, the details of which are given in an embodiment below.

The ADC circuit 406 further comprises an ADC conversion circuit 406b configured to convert the sampled DFS signal 406a to a digital DFS signal 409 at an ADC conversion rate that is lower than the FIR sampling rate. In some embodiments, the ADC conversion rate of the ADC conversion circuit 406b is defined by a sampling rate of the sampled DFS signal 406c, which is approximately 175 Msps (i.e., lower than the FIR sampling rate of 700 Msps), in this embodiment. Further, in some embodiments, the ADC conversion rate is chosen based on Nyquist rate (or oversampled rate). In this embodiment, the ADC conversion rate has an oversampled ratio of approximately 2. That is, for a DFS signal with a baseband bandwidth of 40 MHz, the Nyquist rate is 80 MHz (2×40 MHz) and oversampled rate for 175 Msps is 2.18 (175/80). Typically in such receivers, the ADC conversion rate is chosen to be above the Nyquist rate (for example, an oversampled rate) to allow filtering signals that are aliased. Therefore, in this embodiment, an optimal ADC conversion rate of 175 Msps satisfies both the above criteria. However, in other embodiments, the ADC conversion rate can be chosen differently. For example, by considering a sampling rate of the sampled DFS signal 406c or by the Nyquist criteria or both. In this embodiment, the 175 Msps clock is provided to the ADC conversion circuit 406b by dividing the FIR clock 412a by a dividing ratio, N=4 to obtain an ADC clock 412b of approximately 175 Msps (i.e., 700 Msps/4). In some embodiments, the DSP 408 is configured to receive the digital DFS signal 409 and process the digital DFS signal 409 to determine the presence of radar signals.

Figure 5A:
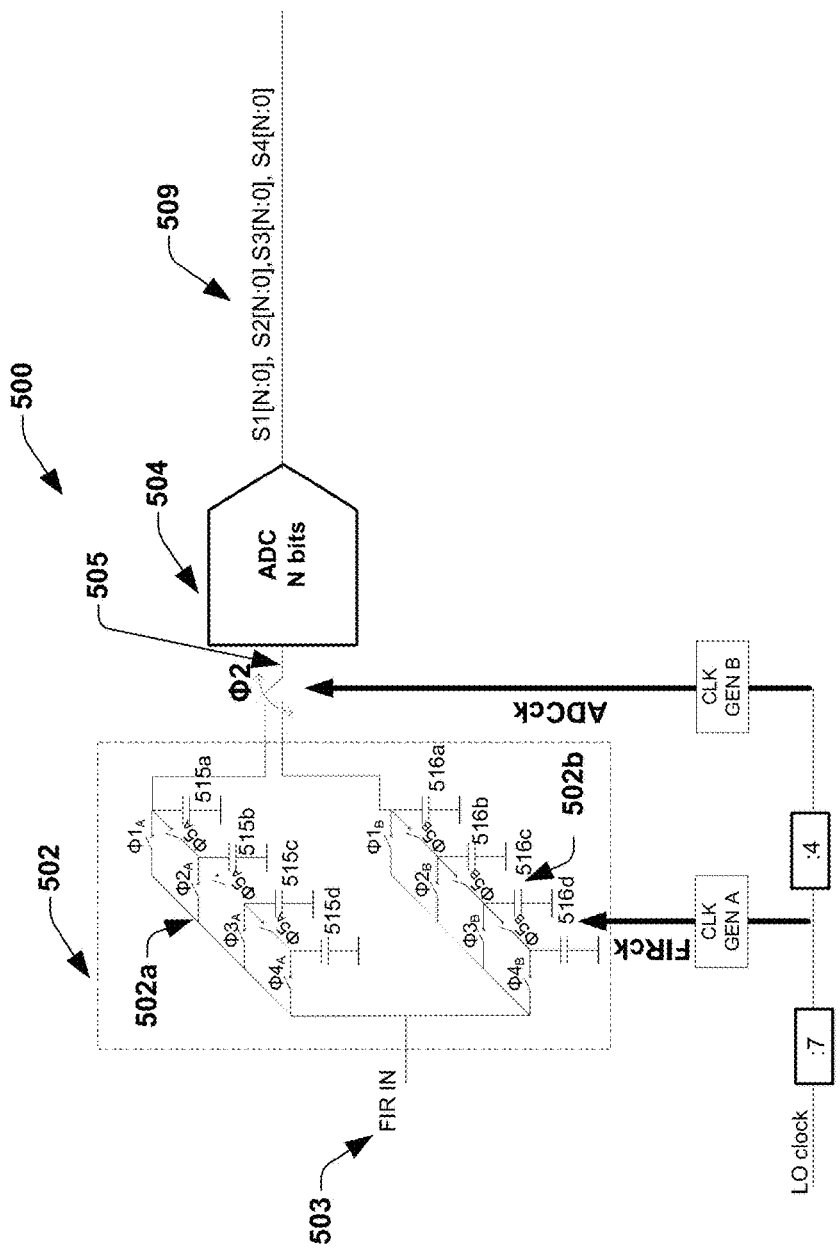
FIG. 5a illustrates an example implementation of an ADC circuit, according to one embodiment of the disclosure.

FIG. 5a illustrates an example implementation of an ADC circuit 500, according to one embodiment of the disclosure. In some embodiments, the ADC circuit 500 illustrates one possible way of implementation of the ADC circuit 306 in FIG. 3 or the ADC circuit 406 in FIG. 4. The ADC circuit 500 is explained herein with reference to the ADC circuit 306 in FIG. 3. The ADC circuit 500 comprises an FIR filter circuit 502 configured to sample a DFS signal 503 (e.g., the down-converted DFS signal 307 in FIG. 3) at an FIR sampling rate, FIRclk to generate a sampled DFS signal 505 (e.g., the sampled DFS signal 306c). In some embodiments, the FIR sampling rate is determined based on the predetermined frequency plan of FIG. 2. The ADC circuit 500 further comprises an ADC conversion circuit 504 configured to convert the sampled DFS signal 507 to a digital DFS signal 509, at an ADC conversion rate, ADCclk that is lower than the FIR sampling rate, FIRclk.

Figure 5B:
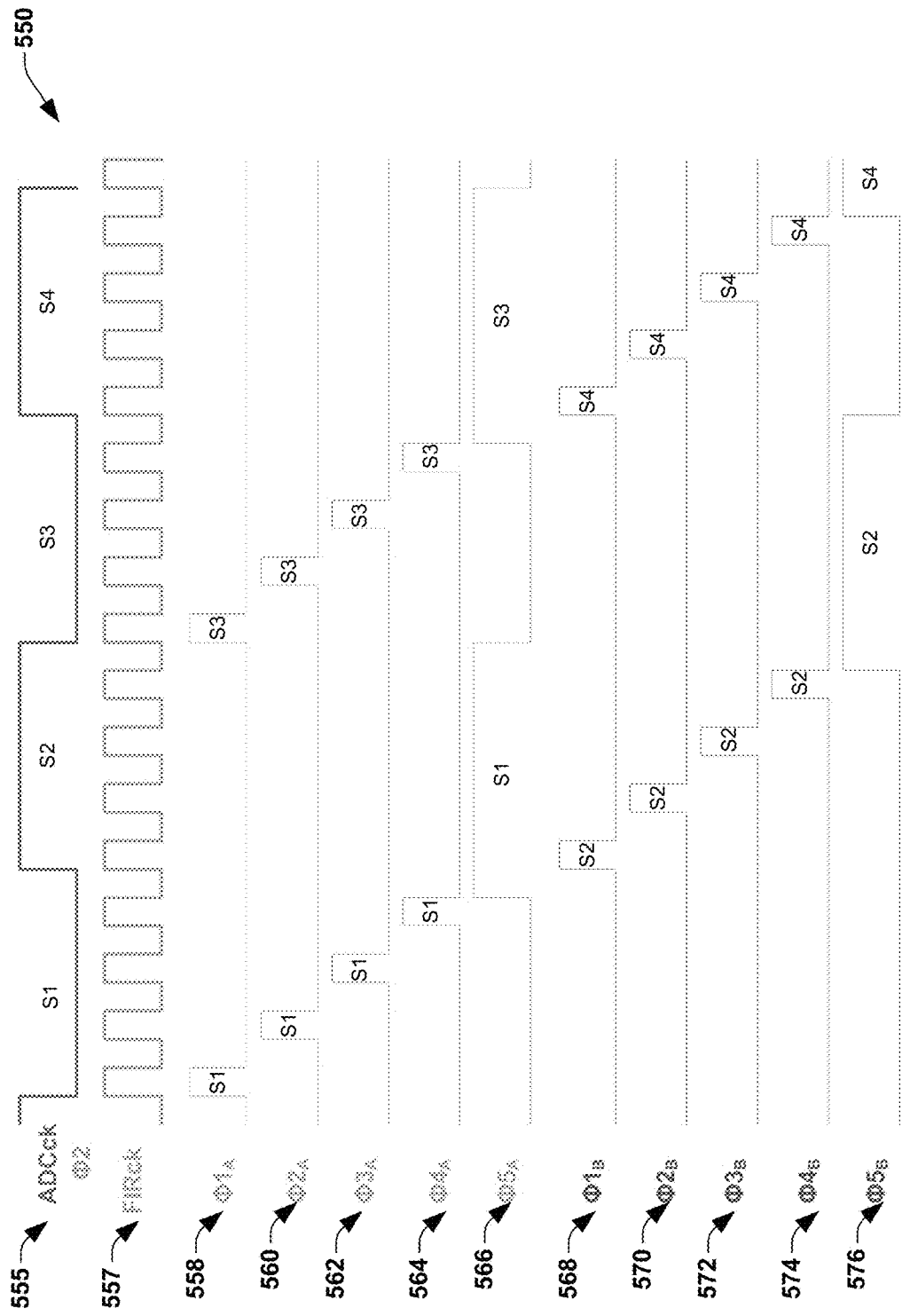
FIG. 5b illustrates a timing diagram of the ADC circuit in FIG. 5a, according to one embodiment of the disclosure.

In some embodiments, the FIR filter circuit 502 comprises a first FIR stage 502a comprising a plurality of sampling capacitors and a second, different FIR stage 502b comprising a plurality of sampling capacitors. In some embodiments, the first FIR stage 502a and the second FIR stage 502b are identical. In this example embodiment, the first FIR stage 502a comprises 4 sampling capacitors (515a, 515b, 515c and 515d) and the second FIR stage 502b comprises 4 sampling capacitors (516a, 516b, 516c and 516d) and the FIR sampling rate is 4 times the ADC conversion rate as illustrated in FIG. 5b. In some embodiments, the first FIR stage 502a is configured to generate the sampled DFS signal 505 during one instance of the ADCclk and the second FIR stage 502b is configured to generate the sampled DFS signal 505 during another instance of the ADCclk. For example, referring to FIG. 5b, during a first instance, when the ADCclk 555 is low, say S1, the first FIR stage 502a is configured to sample the DFS signal 503 across the 4 sampling capacitors (515a, 515b, 515c and 515d) at the FIR sampling rate, FIRclk 557, based on the switching control signals 558, 560, 562 and 564, respectively. The switching control signals 558, 560, 562 and 564 control the switches φ1A, φ2A, φ3A and φ4A of the first FIR stage 502a, respectively. In some embodiments, the switching control signals 558, 560, 562 and 564 are phase shifted with respect to one another so as to sample the DFS signal 503 across the 4 sampling capacitors of the first FIR stage 502a with a phase shift with respect to one another. During a second instance, when the ADCclk 555 is high, say S2, DFS samples across each of the 4 sampling capacitors of the first FIR stage 502a are averaged to generate the sampled DFS signal 505, based on the switching control signal 566. The switching control signal 566 control the switches φ5A of the first FIR stage 502a.

Further, during the second instance, when the ADCclk 555 is high, say S2 in FIG. 5b, the second FIR stage 502b is configured to sample the DFS signal 503 across the 4 sampling capacitors (516a, 516b, 516c and 516d) at the FIR sampling rate, FIRclk 557, based on the switching control signals 568, 570, 572 and 574, respectively. The switching control signals 568, 570, 572 and 574 control the switches φ1B, φ2B, φ3B and φ4B of the second FIR stage 502b, respectively. In some embodiments, the switching control signals 568, 570, 572 and 574 are phase shifted with respect to one another so as to sample the DFS signal 503 across the 4 sampling capacitors of the second FIR stage 502b with a phase shift with respect to one another. And during a third instance, when the ADCclk 555 is low, say S3, DFS samples across each of the 4 sampling capacitors of the second FIR stage 502b are averaged to generate the sampled DFS signal 505, based on the switching control signal 576. The switching control signal 576 control the switches φ5B of the second FIR stage 502b in FIG. 5a. Therefore, in this embodiment, the first FIR stage 502a of the FIR filter circuit 502 is configured to generate the sampled DFS signal 505, when the ADCclk 555 is high (e.g., at S2) and the second FIR stage 502b of the FIR filter circuit 502 is configured to generate the sampled DFS signal 505, when the ADCclk 555 is low (e.g., at S3). In some embodiments, a sampling rate associated with the sampled DFS signal 505 corresponds to the ADC conversion rate, ADCclk 555.

Figure 6:
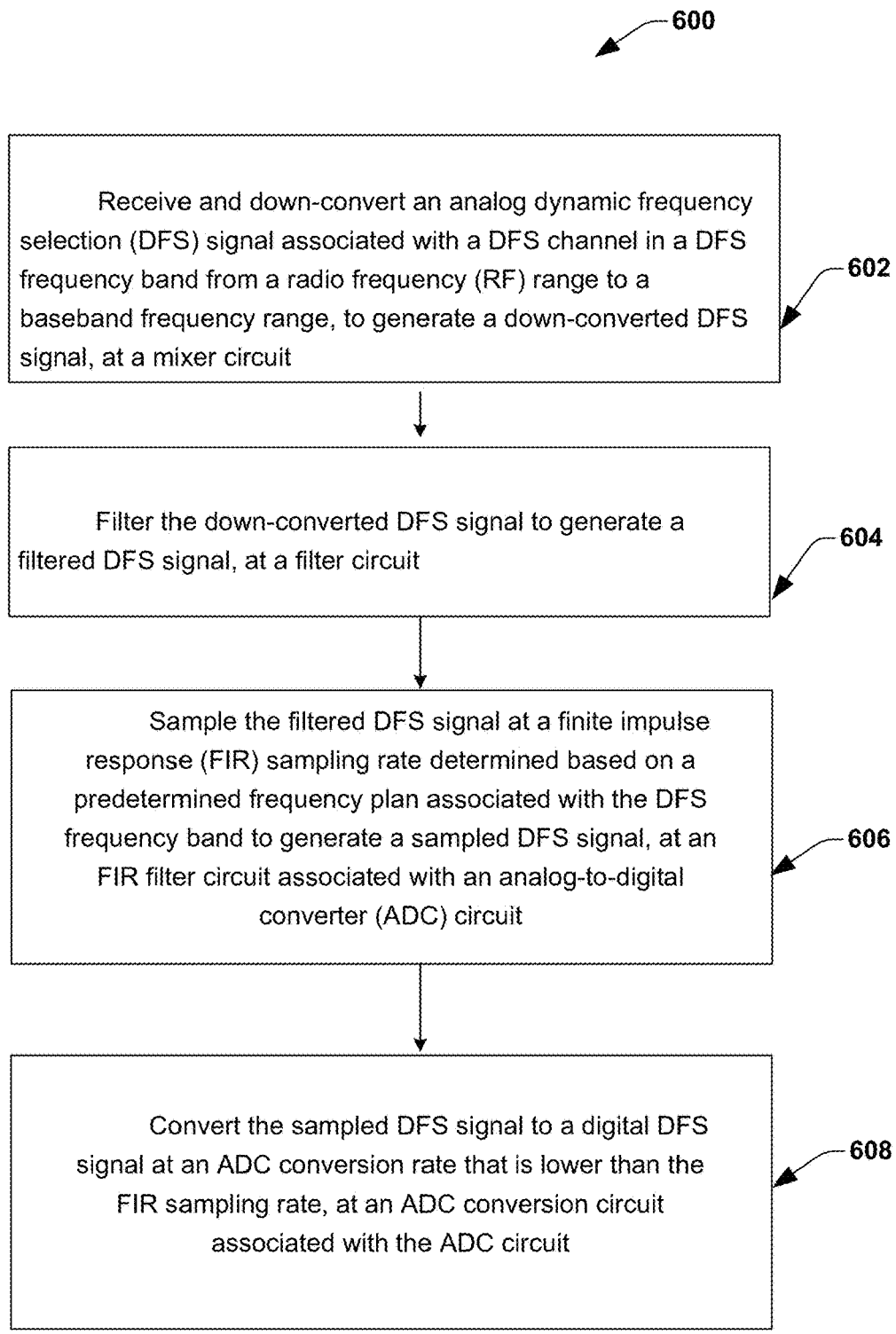
FIG. 6 illustrates a flow chart of a method for a low-power radar detection receiver, according to one embodiment of the disclosure.

FIG. 6 illustrates a flow chart of a method 600 for a low-power radar detector (LPRD) receiver, according to one embodiment of the disclosure. The method 600 is explained herein with respect to the LPRD receiver 300 in FIG. 3. At 602, an analog dynamic frequency selection (DFS) signal (e.g., the DFS signal 303 in FIG. 3) associated with a DFS channel in a DFS frequency band is down-converted from a radio frequency (RF) range to a baseband frequency range, to generate a down-converted DFS signal (e.g., the down-converted DFS signal 305 in FIG. 3), at a mixer circuit (e.g., the mixer circuit 302b in FIG. 3). In some embodiments, the down-converted DFS signal is generated at the mixer circuit based on down mixing the analog DFS signal with a local oscillator signal (e.g., the LO signal 314 in FIG. 3). At 604, the down-converted DFS signal is filtered to generate a filtered DFS signal (e.g., the filtered DFS signal 307), at a filter circuit (e.g., the filter circuit 304). In some embodiments, the filter circuit comprises a first-order filter with a single real pole.

At 606, the filtered DFS signal is sampled at a finite impulse response (FIR) sampling rate determined based on a predetermined frequency plan (as explained in FIG. 2) associated with the DFS frequency band to generate a sampled DFS signal (e.g., the sampled DFS signal 306c), at an FIR filter circuit (e.g., the FIR filter circuit 306a) associated with an analog-to-digital converter (ADC) circuit (e.g., the ADC circuit 306). In some embodiments, the FIR filter circuit comprises a plurality of sampling capacitors configured to sample the filtered DFS signal with a phase shift with respect to one another. At 608, the sampled DFS signal is converted to a digital DFS signal (e.g., the digital DFS signal 309) at an ADC conversion rate that is lower than the FIR sampling rate, at an ADC conversion circuit (e.g., the ADC conversion circuit 306b) associated with the ADC circuit. In some embodiments, the ADC conversion rate is chosen as an oversampled rate based on Nyquist rate.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a low-power radar detection receiver, comprising an analog-to-digital converter (ADC) circuit configured to receive an analog dynamic frequency selection (DFS) signal associated with a DFS channel in a DFS frequency band and generate a digital DFS signal, wherein the ADC circuit comprises a finite impulse response (FIR) filter circuit configured to sample the analog DFS signal at an FIR sampling rate determined based on a predetermined frequency plan associated with the DFS frequency band to generate a sampled DFS signal; and an ADC conversion circuit configured to convert the sampled DFS signal to the digital DFS signal at an ADC conversion rate that is lower than the FIR sampling rate.

Example 2 is a receiver, including the subject matter of example 1, further comprising a filter circuit configured to filter the analog DFS signal, prior to providing the analog DFS signal to the ADC circuit.

Example 3 is a receiver, including the subject matter of examples 1-2, including or omitting elements, further comprising a mixer circuit configured to down-convert the analog DFS signal from a radio frequency (RF) range to a baseband frequency range, prior to providing the analog DFS signal to the filter circuit.

Example 4 is a receiver, including the subject matter of examples 1-3, including or omitting elements, wherein the FIR filter circuit comprises a plurality of sampling capacitors, and wherein the analog DFS signal is sampled across each of the plurality of the sampling capacitors to generate a plurality of respective DFS samples at the FIR sampling rate.

Example 5 is a receiver, including the subject matter of examples 1-4, including or omitting elements, wherein each of sampling capacitors is configured to sample the analog DFS signal with a phase shift with respect to one another.

Example 6 is a receiver, including the subject matter of examples 1-5, including or omitting elements, wherein the plurality of DFS samples is averaged to form the sampled DFS signal which is at a lower frequency than the FIR sampling rate.

Example 7 is a receiver, including the subject matter of examples 1-6, including or omitting elements, wherein the ADC conversion circuit comprises an oversampled ADC and wherein the ADC conversion rate is chosen to be higher than a Nyquist rate defined by a bandwidth of the analog DFS signal.

Example 8 is a receiver, including the subject matter of examples 1-7, including or omitting elements, wherein a number of sampling capacitors in the plurality of sampling capacitors is determined based on the FIR sampling rate and the ADC conversion rate.

Example 9 is a receiver, including the subject matter of examples 1-8, including or omitting elements, wherein the predetermined frequency plan that determines the FIR sampling rate is derived based on a frequency range of the 5 GHz WiFi frequency band and the DFS frequency band.

Example 10 is a receiver, including the subject matter of examples 1-9, including or omitting elements, wherein the FIR sampling rate comprises a sampling rate at which the analog DFS signal is sampled such that WiFi interferers that alias the analog DFS signal when sampled at the FIR sampling rate, are designed to be out of the 5 GHz WiFi frequency band.

Example 11 is a low-power radar detection receiver, comprising a mixer circuit configured to down-convert an analog dynamic frequency selection (DFS) signal associated with a DFS channel in a DFS frequency band from a radio frequency (RF) range to a baseband frequency range, to generate a down-converted DFS signal; a filter circuit configured to filter the down-converted DFS signal to generate a filtered DFS signal; and an analog-to-digital converter (ADC) circuit comprising a finite impulse response (FIR) filter circuit configured to sample the filtered DFS signal at an FIR sampling rate determined based on a predetermined frequency plan associated with the DFS frequency band to generate a sampled DFS signal; and an ADC conversion circuit configured to convert the sampled DFS signal to a digital DFS signal at an ADC conversion rate that is lower than the FIR sampling rate.

Example 12 is a receiver, including the subject matter of example 11, wherein the filter circuit comprises a first order filter circuit comprising a single real pole.

Example 13 is a receiver, including the subject matter of examples 11-12, including or omitting elements, wherein the ADC conversion circuit comprises an oversampled ADC and wherein the ADC conversion rate is chosen to be higher than a Nyquist rate defined by a bandwidth of the down-converted analog DFS signal.

Example 14 is a receiver, including the subject matter of examples 11-13, including or omitting elements, wherein the FIR filter circuit comprises a plurality of sampling capacitors, and wherein the filtered DFS signal is sampled across each of the plurality of the sampling capacitors to generate a plurality of respective DFS samples at the FIR sampling rate.

Example 15 is a receiver, including the subject matter of examples 11-14, including or omitting elements, wherein each of sampling capacitors in the plurality of the sampling capacitors is configured to sample the analog DFS signal with a phase shift with respect to one another.

Example 16 is a receiver, including the subject matter of examples 11-15, including or omitting elements, wherein the plurality of DFS samples is averaged to form the sampled DFS signal which is at a lower frequency compared to the FIR sampling rate.

Example 17 is a receiver, including the subject matter of examples 11-16, including or omitting elements, wherein the plurality of sampling capacitors is divided into a first plurality of sampling capacitors comprising a first FIR stage configured to sample the filtered DFS signal at a first interval, and a second plurality of sampling capacitors comprising a second FIR stage configured to sample the filtered DFS signal at a second, different interval, wherein the first interval and the second interval are defined by the ADC conversion rate.

Example 18 is a method for a low-power radar detection receiver, comprising sampling an analog dynamic frequency selection (DFS) signal associated with a DFS channel in a DFS frequency band, at a finite impulse response (FIR) sampling rate determined based on a predetermined frequency plan associated with the DFS frequency band to generate a sampled DFS signal, at an FIR filter circuit associated with an analog-to-digital converter (ADC) circuit; and converting the sampled DFS signal to a digital DFS signal at an ADC conversion rate that is lower than the FIR sampling rate, at an ADC conversion circuit associated with the ADC circuit.

Example 19 is a method, including the subject matter of example 18, further comprising filtering the analog DFS signal, at a filter circuit, prior to providing the analog DFS signal to the FIR filter circuit.

Example 20 is a method, including the subject matter of examples 18-19, including or omitting elements, further comprising down-converting the analog DFS signal from a radio frequency range to a baseband frequency range at a mixer circuit, prior to providing the analog DFS signal to the filter circuit.

Various illustrative logics, logical blocks, modules, and circuits described in connection with aspects disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A low-power radar detection receiver, comprising:
an analog-to-digital converter (ADC) circuit configured to receive an analog dynamic frequency selection (DFS) signal associated with a DFS channel in a DFS frequency band and generate a digital DFS signal, wherein the ADC circuit comprises:
a finite impulse response (FIR) filter circuit configured to sample the analog DFS signal at an FIR sampling rate determined based on a predetermined frequency plan associated with the DFS frequency band to generate a sampled DFS signal; and
an ADC conversion circuit configured to convert the sampled DFS signal to the digital DFS signal at an ADC conversion rate that is lower than the FIR sampling rate.

2. The receiver of claim 1, further comprising a filter circuit configured to filter the analog DFS signal, prior to providing the analog DFS signal to the ADC circuit.

3. The receiver of claim 2, further comprising a mixer circuit configured to down-convert the analog DFS signal from a radio frequency (RF) range to a baseband frequency range, prior to providing the analog DFS signal to the filter circuit.

4. The receiver of claim 1, wherein the FIR filter circuit comprises a plurality of sampling capacitors, and wherein the analog DFS signal is sampled across each of the plurality of the sampling capacitors to generate a plurality of respective DFS samples at the FIR sampling rate.

5. The receiver of claim 4, wherein each of sampling capacitors is configured to sample the analog DFS signal with a phase shift with respect to one another.

6. The receiver of claim 4, wherein the plurality of DFS samples is averaged to form the sampled DFS signal which is at a lower frequency than the FIR sampling rate.

7. The receiver of claim 4, wherein the ADC conversion circuit comprises an oversampled ADC and wherein the ADC conversion rate is chosen to be higher than a Nyquist rate defined by a bandwidth of the analog DFS signal.

8. The receiver of claim 7, wherein a number of sampling capacitors in the plurality of sampling capacitors is determined based on the FIR sampling rate and the ADC conversion rate.

9. The receiver of claim 1, wherein the predetermined frequency plan that determines the FIR sampling rate is derived based on a frequency range of the 5 GHz WiFi frequency band and the DFS frequency band.

10. The receiver of claim 9, wherein the FIR sampling rate comprises a sampling rate at which the analog DFS signal is sampled such that WiFi interferers that alias the analog DFS signal when sampled at the FIR sampling rate, are designed to be out of the 5 GHz WiFi frequency band.

11. A low-power radar detection receiver, comprising:
a mixer circuit configured to down-convert an analog dynamic frequency selection (DFS) signal associated with a DFS channel in a DFS frequency band from a radio frequency (RF) range to a baseband frequency range, to generate a down-converted DFS signal;
a filter circuit configured to filter the down-converted DFS signal to generate a filtered DFS signal; and
an analog-to-digital converter (ADC) circuit comprising:
a finite impulse response (FIR) filter circuit configured to sample the filtered DFS signal at an FIR sampling rate determined based on a predetermined frequency plan associated with the DFS frequency band to generate a sampled DFS signal; and
an ADC conversion circuit configured to convert the sampled DFS signal to a digital DFS signal at an ADC conversion rate that is lower than the FIR sampling rate.

12. The receiver of claim 11, wherein the filter circuit comprises a first order filter circuit comprising a single real pole.

13. The receiver of claim 11, wherein the ADC conversion circuit comprises an oversampled ADC and wherein the ADC conversion rate is chosen to be higher than a Nyquist rate defined by a bandwidth of the down-converted analog DFS signal.

14. The receiver of claim 11, wherein the FIR filter circuit comprises a plurality of sampling capacitors, and wherein the filtered DFS signal is sampled across each of the plurality of the sampling capacitors to generate a plurality of respective DFS samples at the FIR sampling rate.

15. The receiver of claim 14, wherein each of sampling capacitors in the plurality of the sampling capacitors is configured to sample the analog DFS signal with a phase shift with respect to one another.

16. The receiver of claim 14, wherein the plurality of DFS samples is averaged to form the sampled DFS signal which is at a lower frequency compared to the FIR sampling rate.

17. The receiver of claim 14, wherein the plurality of sampling capacitors is divided into a first plurality of sampling capacitors comprising a first FIR stage configured to sample the filtered DFS signal at a first interval, and a second plurality of sampling capacitors comprising a second FIR stage configured to sample the filtered DFS signal at a second, different interval, wherein the first interval and the second interval are defined by the ADC conversion rate.

18. A method for a low-power radar detection receiver, comprising:
sampling an analog dynamic frequency selection (DFS) signal associated with a DFS channel in a DFS frequency band, at a finite impulse response (FIR) sampling rate determined based on a predetermined frequency plan associated with the DFS frequency band to generate a sampled DFS signal, at an FIR filter circuit associated with an analog-to-digital converter (ADC) circuit; and
converting the sampled DFS signal to a digital DFS signal at an ADC conversion rate that is lower than the FIR sampling rate, at an ADC conversion circuit associated with the ADC circuit.

19. The method of claim 18, further comprising filtering the analog DFS signal, at a filter circuit, prior to providing the analog DFS signal to the FIR filter circuit.

20. The method of claim 19, further comprising down-converting the analog DFS signal from a radio frequency range to a baseband frequency range at a mixer circuit, prior to providing the analog DFS signal to the filter circuit.

* * * * *